(12) United States Patent
Ko et al.

(10) Patent No.: US 12,530,138 B2
(45) Date of Patent: Jan. 20, 2026

(54) MEMORY CONTROL DEVICE AND REFRESH CONTROL METHOD THEREOF

(71) Applicant: Samsung Electronics Co., Ltd., Suwon-si (KR)

(72) Inventors: Junyoung Ko, Suwon-si (KR); Jungmin Bak, Suwon-si (KR); Changhwi Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 183 days.

(21) Appl. No.: 18/312,779

(22) Filed: May 5, 2023

(65) Prior Publication Data
US 2024/0069757 A1 Feb. 29, 2024

(30) Foreign Application Priority Data

Aug. 30, 2022 (KR) .................. 10-2022-0109161
Nov. 1, 2022 (KR) .................. 10-2022-0143809

(51) Int. Cl.
| | | |
|---|---|---|
| G06F 3/00 | (2006.01) | |
| G06F 3/06 | (2006.01) | |
| G06F 12/14 | (2006.01) | |
| G06F 13/16 | (2006.01) | |
| G11C 11/00 | (2006.01) | |
| G11C 11/406 | (2006.01) | |

(52) U.S. Cl.
CPC .......... *G06F 3/0623* (2013.01); *G06F 3/0653* (2013.01); *G06F 3/0673* (2013.01); *G06F 12/1425* (2013.01); *G06F 13/1636* (2013.01); *G11C 11/40607* (2013.01); *G11C 11/40615* (2013.01); *G11C 11/40618* (2013.01); *G11C 11/40622* (2013.01)

(58) Field of Classification Search
CPC ............. G06F 12/1425; G06F 13/1636; G11C 2211/4068; G11C 11/40607; G11C 11/40615; G11C 11/40618; G11C 11/40622
See application file for complete search history.

(56) References Cited

U.S. PATENT DOCUMENTS

| | | | |
|---|---|---|---|
| 9,449,671 | B2 | 9/2016 | Crawford et al. |
| 9,672,891 | B2 | 6/2017 | Kang et al. |
| 10,210,925 | B2 | 2/2019 | Bains et al. |
| 10,248,340 | B2 | 4/2019 | Ahn et al. |
| 10,978,132 | B2 | 4/2021 | Rehmeyer et al. |
| 11,017,834 | B2 | 5/2021 | Meier et al. |
| 2022/0044720 | A1 | 2/2022 | Wieduwilt et al. |
| 2022/0375509 | A1* | 11/2022 | Meier ............... G06F 3/0673 |
| 2022/0415384 | A1* | 12/2022 | SeyedzadehDelcheh ............... G11C 11/40603 |

* cited by examiner

*Primary Examiner* — Reginald G Bragdon
*Assistant Examiner* — Michael L Westbrook
(74) *Attorney, Agent, or Firm* — Wolf, Greenfield & Sacks, P.C.

(57) ABSTRACT

A memory control device includes a threshold generating circuit, which is configured to set a first threshold for a first memory module electrically coupled to the memory control device. This first threshold is based on information associated with the first memory module. An attack defense circuit is also provided, which is configured to count an input row address, and decide a row address whose count value exceeds the first threshold among row addresses of the first memory module as an aggressor row address.

16 Claims, 13 Drawing Sheets

MEMORY CONTROL DEVICE AND REFRESH CONTROL METHOD THEREOF

REFERENCE TO PRIORITY APPLICATIONS

This application claims priority to Korean Patent Application No. 10-2022-0109161, filed Aug. 30, 2022, and Korean Patent Application No. 10-2022-0143809, filed Nov. 1, 2022, the disclosures of which are hereby incorporated herein by reference.

BACKGROUND

The disclosure relates to memory systems and, more particularly, to memory systems having memory control devices and refresh control logic therein, and methods of operating said memory systems.

A volatile memory device such as a dynamic random-access memory (DRAM) may store data by storing charges within a capacitor of a memory cell, and may read data by determining the charges stored in the capacitor. Because charges stored in the capacitor may leak over time, the memory device may periodically perform a refresh operation on the memory cells.

A memory controller of the memory device may access an address of the memory device randomly, and may access a particular address frequently or intensively. As the density of memory cells in the memory device increases, due to a voltage distribution of a row, the influence of charges in memory cells of an adjacent rows may increase. In particular, when an "attack" caused by repeatedly accessing a certain row is performed, due to a voltage of an active state of the certain row, data stored in memory cells of an adjacent row(s) may be changed and yield data errors. This phenomenon within DRAM devices is called "rowhammering". Memory devices to which an attack defense function such as a rowhammer defense function is not applied or the latest attack defense function is not applied may be vulnerable to such attacks.

SUMMARY

Some embodiments include a memory control device and a refresh control method thereof, which provide an attack defense function to a memory device.

According to some embodiments, a memory control device to which one or more memory modules including a first memory module are connected may be provided. The memory control device may include a threshold generating circuit and an attack defense circuit. The threshold generating circuit may set a first threshold for the first memory module based on information associated with the first memory module. The attack defense circuit may count an input row address, and decide a row address whose count value exceeds the first threshold among row addresses of the first memory module as an aggressor row address of the first memory module.

According to additional embodiments, a memory control device to which a plurality of memory modules are connected may be provided. The memory control device may include a threshold generating circuit, a counter circuit, a comparator circuit, and an address register. The threshold generating circuit may set a threshold for each of the plurality of memory modules based on information associated with each of the memory modules. The counter circuit may count input row addresses. The comparator circuit may compare the count value of the input row address with the threshold of a target memory module to which the input row address belongs among the plurality of memory modules. The address register stores the input row address, and when a count value of the input row address exceeds the threshold of the target memory module, the input row address may be determined as an aggressor row address of the target memory module.

According to some embodiments, a refresh control method of a memory controller coupled to one or more memory modules may be provided. The refresh control method may include: (i) receiving an input row address, (ii) setting, based on information of a target memory module to which the input row address belongs among the one or more memory modules, a threshold for the target memory module, (iii) comparing a count value of the input row address with the threshold, (iv) determining the input row address as an aggressor row address when the count value exceeds the threshold, and (v) instructing the target memory module to refresh a row determined based on the aggressor row address.

DETAILED DESCRIPTION OF THE EMBODIMENTS

Figure 1:
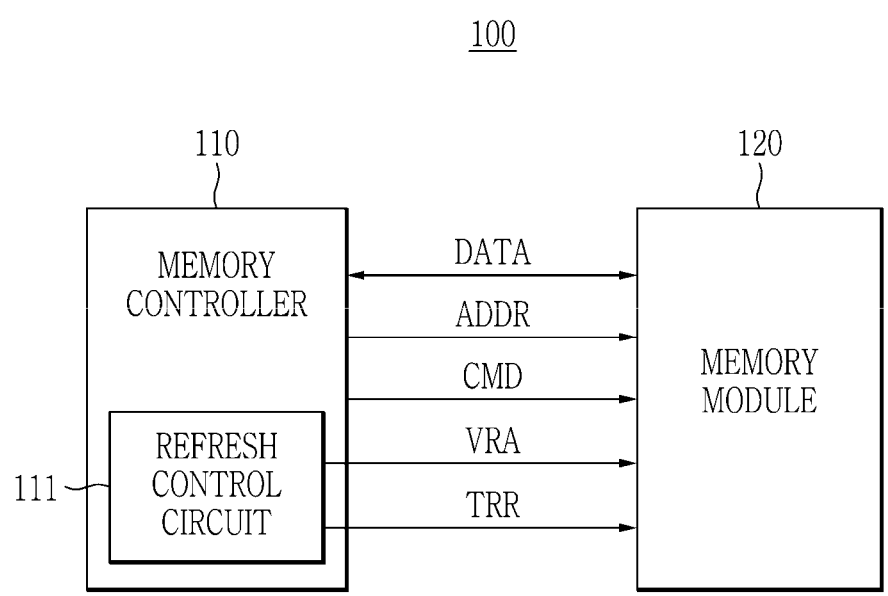
FIG. 1 is a block diagram illustrating a memory system according to some embodiments.

In the following detailed description, only certain embodiments of the present invention have been shown and described, simply by way of illustration. As those skilled in the art would realize, the described embodiments may be modified in various different ways, all without departing from the spirit or scope of the present invention.

Accordingly, the drawings and description are to be regarded as illustrative in nature and not otherwise restrictive. Like reference numerals designate like elements throughout the specification. The sequence of operations or steps is not limited to the order presented in the claims or figures unless specifically indicated otherwise. The order of operations or steps may be changed, several operations or steps may be merged, a certain operation or step may be divided, and a specific operation or step may not be performed.

As used herein, the singular forms "a" and "an" are intended to include the plural forms as well, unless the context clearly indicates otherwise. Although the terms first, second, and the like may be used herein to describe various elements, components, steps and/or operations, these terms are only used to distinguish one element, component, step or operation from another element, component, step, or operation.

FIG. 1 is a block diagram illustrating an example of a memory system according to some embodiments. Referring to FIG. 1, a memory system 100 may include a memory controller 110 and a memory module 120. The memory controller 110 may be referred to as a "memory control device." In some embodiments, the memory device 110 and the memory controller 120 may be connected through a memory interface to send and receive signals through the memory interface. In some embodiments, the memory system 100 may include a plurality of memory modules 120.

The memory module 120 may include a plurality of memory chips. In some embodiments, the memory chips may be mounted on a circuit board to form the memory module 120. In some embodiments, the memory module 120 may be a dual in-line memory module (DIMM). In some embodiments, the memory chip may be a DRAM chip. In some other embodiments, the memory chip may be another memory chip for which a refresh operation may be used. The memory chip may include a memory cell array. The memory cell array may include a plurality of memory cells defined by a plurality of rows and a plurality of columns.

The memory controller 110 may receive a memory request from a host. The memory request may include an address of the memory module 120 to be accessed and a type of the memory request. The memory controller 110 may control a memory operation of the memory module 120 by providing a signal to the memory module 120 based on the memory request. The signal may include a command CMD and an address ADDR. In some embodiments, the memory controller 110 may provide the command CMD and the address ADDR to the memory module 120 to access the memory chip and control the memory operation such as read or write. Data may be transferred from the memory chip to the memory controller 110 in response to a read operation, and data may be transferred from the memory controller 110 to the memory chip in response to a write operation.

The command CMD may include an activate command, a read/write command, and a refresh command. In some embodiments, the command CMD may further include a precharge command. The activate command may be a command for activating a target row of the memory chip to write data to or read data from the memory chip. The read/write command may be a command for performing the read or write operation on a target memory cell of the activated row. The refresh command may be a command for performing a refresh operation in the memory chip. In some embodiments, the refresh command may include a normal refresh command and/or a target row refresh command. The target row refresh command may be a refresh command that instructs an operation to refresh a victim row. Since the target row refresh targets the victim row, it may be referred to as a "targeted refresh" or a "forced refresh." The normal refresh command may be a refresh command, for example, that instructs an operation for sequentially refreshing rows of the memory chip. The normal refresh may include, for example, an auto-refresh performed when the memory module 120 is in use and a self-refresh performed when the memory module 120 is in an idle state.

The memory controller 110 may include a refresh control circuit 111. The refresh control circuit 111 may detect an aggressor row among a plurality of rows of the memory chip, and determine a victim row (i.e., a target row) to be refreshed based on a row address (referred to as "aggressor row address") of the aggressor row. In some embodiments, the aggressor row may be a rowhammer aggressor row, and the victim row may be a row to be refreshed in response to a rowhammer attack. The refresh control circuit 111 may determine a threshold used to detect the aggressor row address based on information associated with the memory module 120. In some embodiments, the refresh control circuit 111 may compare a count value indicating the number of accesses of each row in the memory module 120 with the threshold, and determine an address of a row having the count value exceeding the threshold as the aggressor row address.

In some embodiments, the refresh control circuit 111 may transfer a victim row address VRA determined based on the aggressor row address and a target row refresh command TRR to the memory module 120. The memory module 120 may refresh the victim row indicated by the victim row address VRA in response to the target row refresh command TRR.

Figure 2:
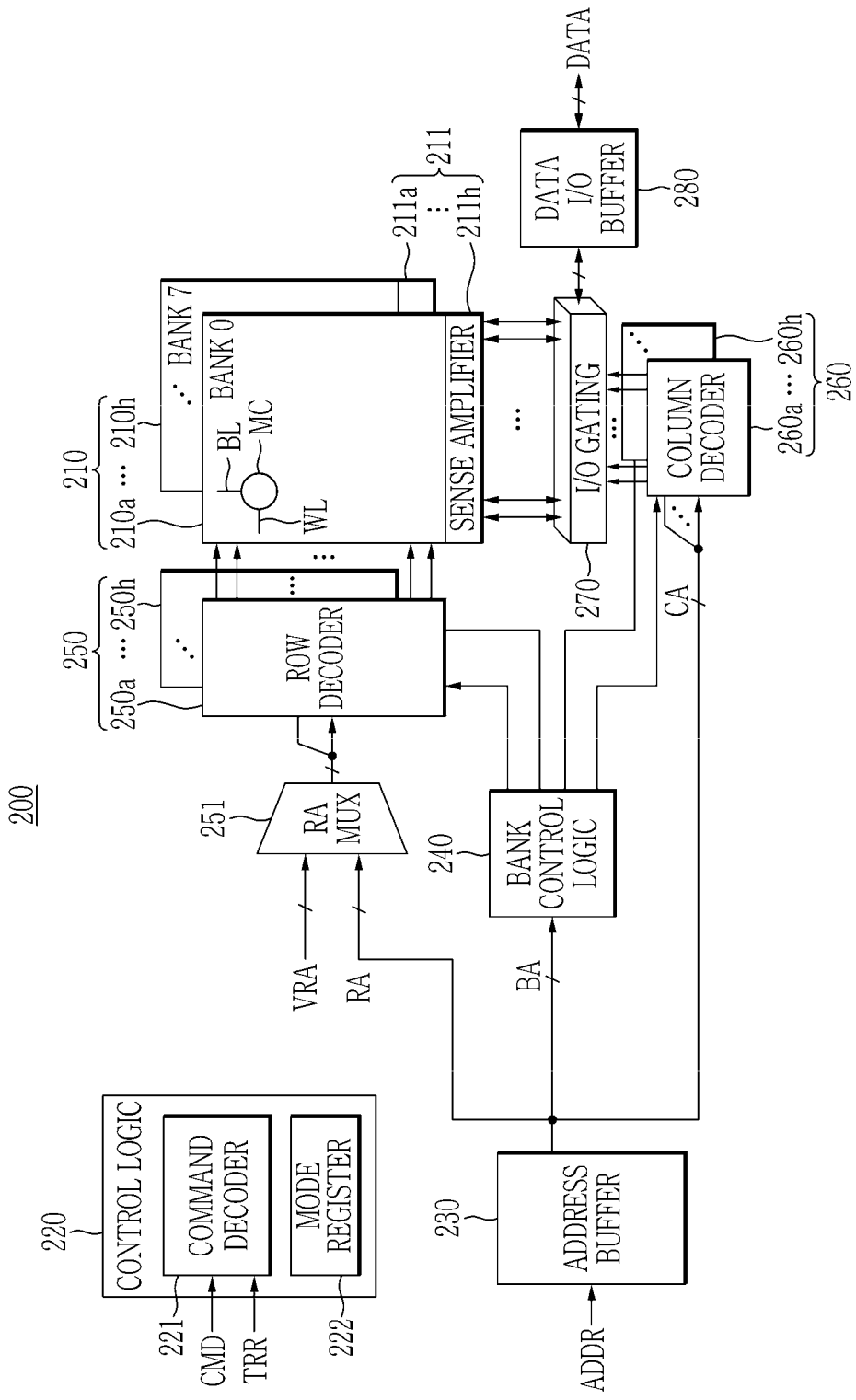
FIG. 2 is a block diagram illustrating a memory chip according to some embodiments.

FIG. 2 is a block diagram illustrating an example of a memory chip according to some embodiments. Referring to FIG. 2, a memory chip 200 may include a memory cell array 210, a sense amplifier 211, a control logic circuit 220, an address buffer 230, a row decoder 250, a column decoder 260, an input/output (I/O) gating circuit 270, and a data I/O buffer 280. The memory cell array 210 may include a plurality of memory cells MC, and may be arranged into a plurality of memory banks 210a to 210h. Although FIG. 2 shows eight memory banks (BANK0 to BANK7) 210a to 210h, the number of memory banks is not limited thereto. Each of the memory banks 210a to 210h may include a plurality of rows, a plurality of columns, and a plurality of memory cells MC arranged at intersections of the plurality of rows and the plurality of columns. In some embodiments, the rows may be defined by a plurality of wordlines WL, and the columns may be defined by a plurality of bitlines BL.

The control logic circuit 220 may control an operation of the memory chip 200. For example, the control logic circuit 220 may generate a control signal so that the memory device 200 may perform a read operation, a write operation, or a refresh operation. In some embodiments, the control logic circuit 220 may include a command decoder 221. The command decoder 221 may generate a control signal by decoding a command CMD received from a memory controller (see, e.g., 110 in FIG. 1). In some embodiments, the command decoder 221 may receive a target row refresh command TRR from the memory controller 110. In some embodiments, the control logic circuit 220 may further include a mode register 222 that sets an operating mode of the memory device 200.

The address buffer 230 may receive an address ADDR provided by the memory controller 110. The address ADDR may include a row address RA indicating a row of the memory cell array 210 and a column address CA indicating a column of the memory cell array 210. The row address RA may be provided to the row decoder 250, and the column address CA may be provided to the column decoder 260. In some embodiments, the row address RA may be provided to the row decoder 250 via a row address multiplexer 251. In some embodiments, the address ADDR may further include a bank address BA indicating a memory bank.

In some embodiments, the memory chip 200 may further include the row address multiplexer 251. The row address multiplexer 251 may receive the row address RA from the address buffer 230 and a victim row address VRA to be refreshed from the memory controller 110. The row address multiplexer 251 may selectively output the row address RA received from the address buffer 230 and the victim row address.

The row decoder 250 may select a row to be activated from among the rows of the memory cell array 210 based on the row address RA or VRA. The row decoder 250 may apply a driving voltage to a wordline corresponding to the row to be activated. In some embodiments, a plurality of row decoders 250a to 250h respectively corresponding to the memory banks 210a to 210h may be provided. The column decoder 260 may select a column to be activated from among the columns of the memory cell array 210 based on the column address CA. The column decoder 260 may activate the sense amplifier 211 corresponding to the column address CA through the I/O gating circuit 270. In some embodiments, a plurality of column decoders 260a to 260h respectively corresponding to the memory banks 210a to 210h may be provided. In some embodiments, the I/O gating circuit 270 may gate I/O data, and may include a data latch that stores data read from the memory cell array 210 and a write driver that writes data to the memory cell array 210. The data read from the memory cell array 210 may be sensed by the sense amplifier 211 and stored in the I/O gating circuit 270 (e.g., the data latch). In some embodiments, a plurality of sense amplifiers 211a to 211h respectively corresponding to the memory banks 210a to 210h may be provided.

In some embodiments, the memory chip 200 may further include a bank control logic 240 that generates a bank control signal in response to the bank address BA. In response to the bank control signal, a row decoder 250 corresponding to the bank address BA among the row decoders 250a to 250h may be activated, and a column decoder 260 corresponding to the bank address BA among the column decoders 260a to 260h may be activated.

In some embodiments, the data read from the memory cell array 210 (e.g., the data stored in the data latch) may be provided to the memory controller 110 via the data I/O buffer 280. The data to be written to the memory cell array 210 may be provided from the memory controller 110 to the data I/O buffer 280, and the data provided to the data I/O buffer 280 may be provided to the I/O gating circuit 270.

Figure 3:
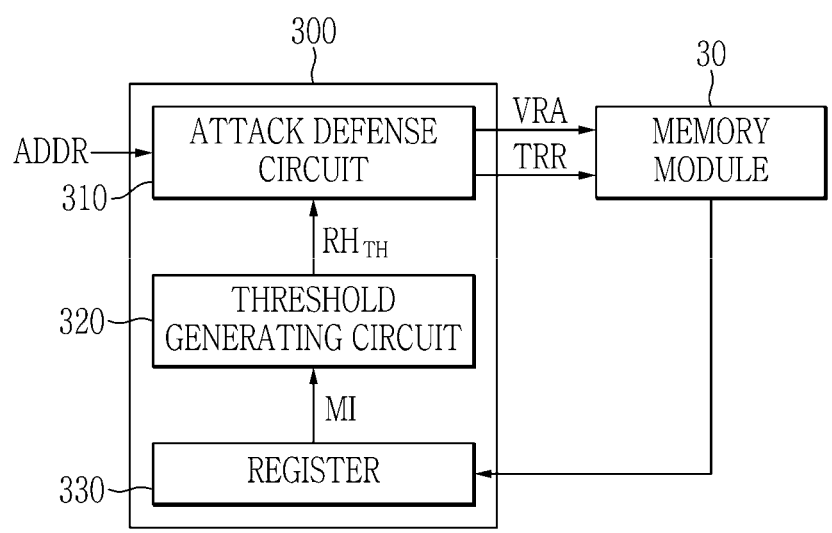
FIG. 3 is a block diagram illustrating a refresh control circuit according to some embodiments.
Figure 4:
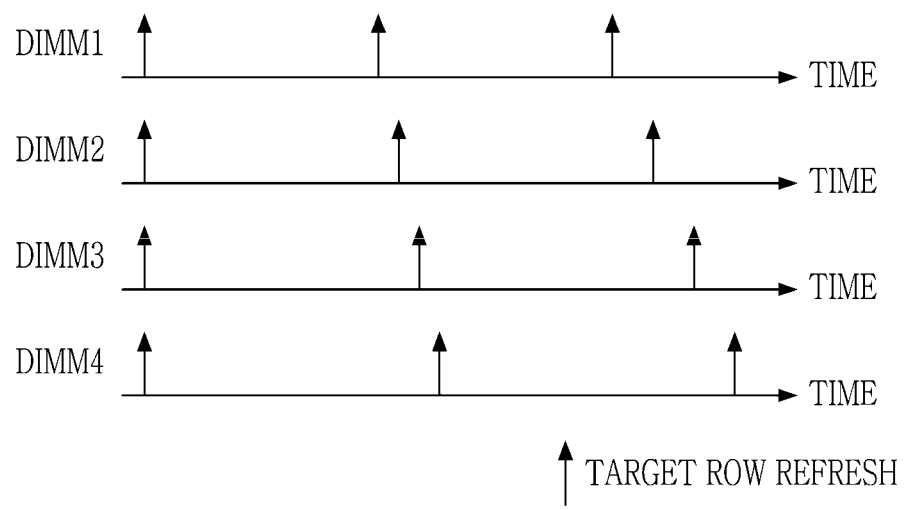
FIG. 4 is a diagram illustrating an example of a refresh period, which is controlled by a refresh control circuit according to some embodiments.

FIG. 3 is a block diagram illustrating an example of a refresh control circuit according to some embodiments, and FIG. 4 is a diagram illustrating an example of a refresh period controlled by a refresh control circuit according to some embodiments. Referring now to FIG. 3, a refresh control circuit 300 may include an attack defense circuit 310, a threshold generating circuit 320, and a register 330. In some embodiments, the refresh control circuit 300 may be included in a memory controller (see, e.g., 110 in FIG. 1).

The threshold generating circuit 320 may determine a threshold $RH_{TH}$ of a memory module 30 connected to the memory controller 110 based on information MI of the memory module 30 received from the memory module 30. In some embodiments, when a plurality of memory modules 30 are connected to the memory controller 110, the threshold generating circuit 320 may set the threshold $RH_{TH}$ of each of the memory modules 30 based on the information MI of a corresponding memory module 30. In some embodiments, the refresh control circuit 300 may further include a register 330 that records the information MI of the memory module 30. Accordingly, the threshold generating circuit 320 may use a value recorded in the register 330 as the information MI of the memory module 30. In some embodiments, the information MI of the memory module 30 may be recorded in the register 330 during a process of connecting the memory module 30 to the memory controller 110. In some embodiments, the information MI recorded in a mode register (see, e.g., 222 in FIG. 2) of the memory module 30 may be recorded in the register 330.

The threshold generating circuit 320 may determine the threshold $RH_{TH}$ by reflecting the information MI of the memory module 30 to an initial threshold. In some embodiments, the threshold generating circuit 320 may determine the threshold $RH_{TH}$ by adding an addition value determined based on the information MI of the memory module 30 to the initial threshold. In some embodiments, the information MI of the memory module 30 may include at least one of identification information associated with the memory module 30, performance of the memory module 30, and a reliability of the memory module 30. The identification information may include, for example, a manufacturer of the memory module 30 or a serial number of the memory module 30. The performance may indicate, for example, read and/or write speed of the memory module 30, and the reliability may indicate, for example, a usage period of the memory module 30. The usage period may be determined by, for example, a manufacturing date of the memory module 30. The threshold generating circuit 320 may set the threshold $RH_{TH}$ to a value obtained by adding the initial threshold of the memory module 30 to at least one of a basic value determined by the identification information associated with the memory module 30, a performance value determined by the performance of the memory module 30, and a reliability value determined by the reliability of the memory module 30. In some embodiments, as the performance of the memory module 30 is improved (e.g., as its speed increases), the threshold generating circuit 320 may increase the performance value. Similarly, as the reliability of the memory module 30 is improved (e.g., as the usage period decreases), the threshold generating circuit 320 may increase the reliability value.

The attack defense circuit 310 may receive an address ADDR from the host, and count a row address (hereinafter referred to as an "input row address") included in the address ADDR. Further, the attack defense circuit 310 may identify the memory module 30 to which the input row address belongs based on a memory module address included in the address ADDR received from the host. The attack defense circuit 310 may detect the input row address as an aggressor row address when a count value (i.e., an accumulated count value) of the input row address exceeds the threshold $RH_{TH}$. In some embodiments, the attack defense circuit 310 may use the threshold $RH_{TH}$ of the memory module 30 to which the input row address belongs when comparing the count value of the input row address with the threshold $RH_{TH}$. In some embodiments, the attack defense circuit 310 may determine a victim row address VRA based on the detected aggressor row address, and transfer the victim row address VRA to the memory module 30 to which the aggressor row address belongs. In some embodiments, the attack defense circuit 310 may transfer the aggressor row address to the memory module 30 to which the aggressor row address belongs. In this case, the memory module 30 may determine a victim row address based on the aggressor row address. The attack defense circuit 310 may determine a row adjacent to the aggressor row indicated by the aggressor row address as a victim row. In some embodiments, the victim row(s) may include a predetermined number of rows that are closely adjacent to the aggressor row. For example, when the aggressor row is the $m^{th}$ row and the predetermined number is two, the victim row may include the (m+1)th row and the $(m-1)^{th}$ row, which are two immediately adjacent rows. Alternatively, when the aggressor row is the $m^{th}$ row and the predetermined number is four, the victim row may include the $(m+2)^{th}$ row, the $(m+1)^{th}$ row, the $(m-1)^{th}$ row, and $(m-2)^{th}$ row. In some embodiments, the attack defense circuit 310 may transfer the target row refresh command TRR to the corresponding memory module 30 when transferring the victim row address VRA.

As shown in FIG. 4, it is assumed that a plurality of memory modules DIMM1, DIMM2, DIMM3, and DIMM4, which are different models, are connected to a memory controller. Accordingly, the refresh control circuit 300 of the memory controller may set thresholds of the memory modules DIMM1, DIMM2, DIMM3, and DIMM4 to different values. Therefore, when the memory modules DIMM1, DIMM2, DIMM3, and DIMM4 are under the same attack, target row refreshes may be performed at different cycles for each of the memory modules DIMM1, DIMM2, DIMM3, and DIMM4 since the thresholds for the memory modules DIMM1, DIMM2, DIMM3, and DIMM4 are different from one another.

According to the above-described embodiments, when the memory module is connected to the memory controller, the memory controller may set a threshold adapted to the connected memory module, thereby providing an appropriate attack defense logic. In some embodiments, when heterogeneous memory modules are connected to the memory controller, the memory controller may provide an attack defense logic suitable for each of the different memory modules by using different thresholds for the different memory modules. In some embodiments, the memory controller may be used for compute express link (CXL), cache coherent interconnect for accelerators (CCIX), or generation Z (Gen-Z) to which heterogeneous memory modules may be connected.

Figure 5:
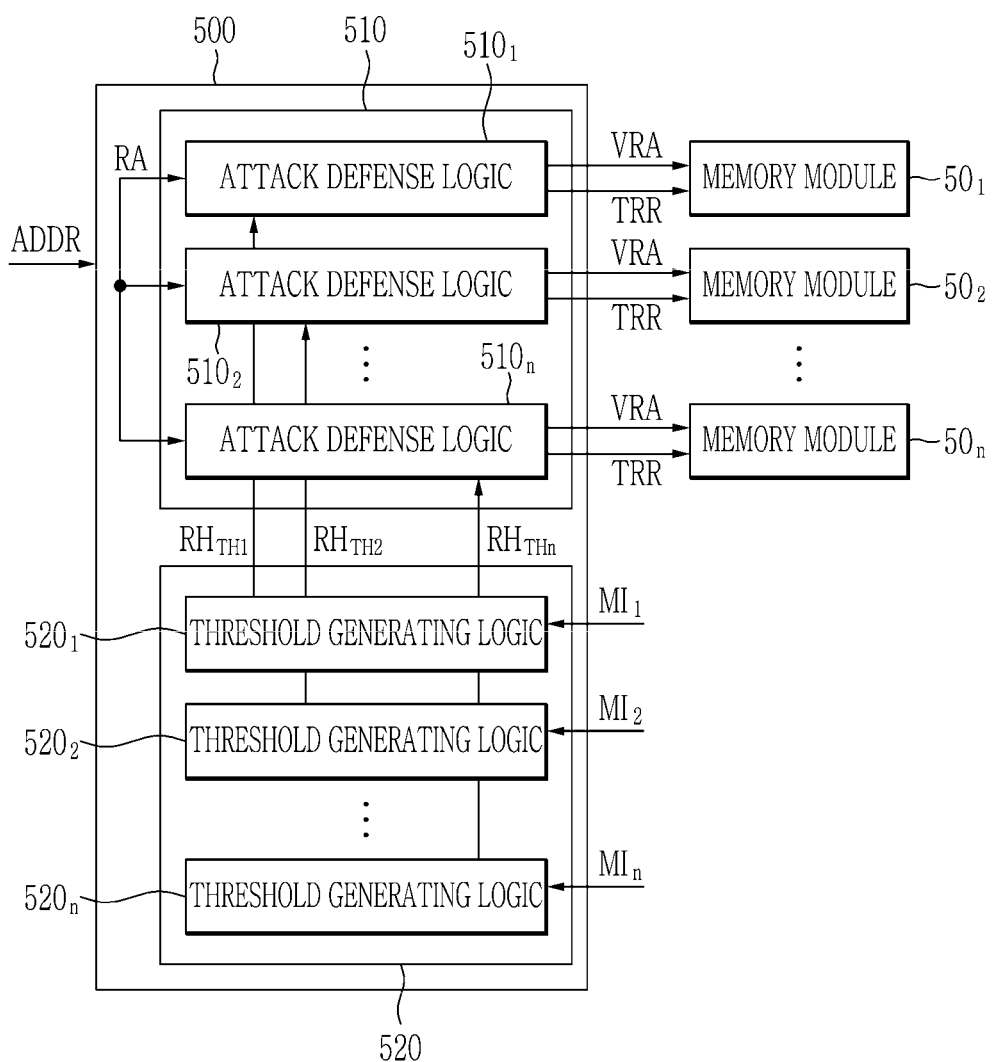
FIG. 5 is a block diagram illustrating a refresh control circuit according to some embodiments.
Figure 6:
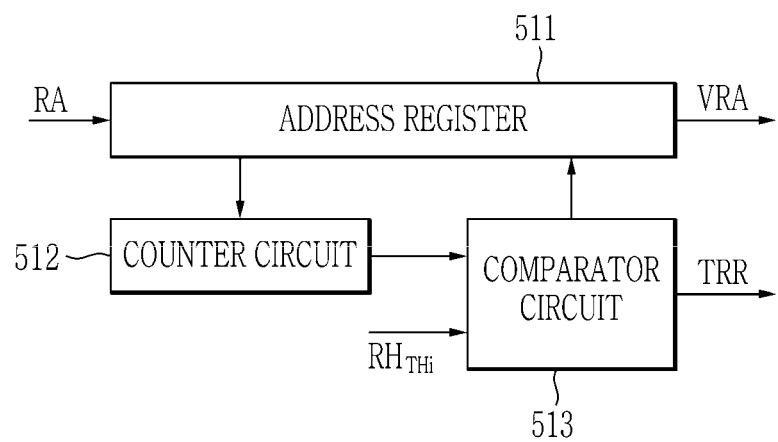
FIG. 6 is a block diagram illustrating an embodiment of the attack defense logic shown in FIG. 5.
Figure 7:
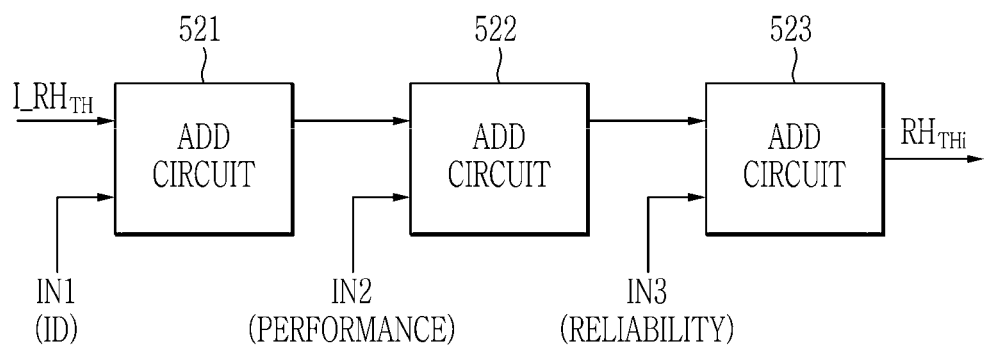
FIG. 7 is a block diagram illustrating an embodiment of the threshold generating circuit shown in FIG. 5.

FIG. 5 is a block diagram illustrating an example of a refresh control circuit according to some embodiments, FIG. 6 is a block diagram illustrating an example of an attack defense logic shown in FIG. 5, and FIG. 7 is a block diagram illustrating an example of a threshold generating circuit shown in FIG. 5. Referring now to FIG. 5, a refresh control circuit 500 may include an attack defense circuit 510 and a threshold generating circuit 520. A memory controller including the refresh control circuit 500 may be connected to a plurality of memory modules $50_1$, $50_2$ . . . $50_n$. The attack defense circuit 510 may include a plurality of attack defense logics $510_1$, $510_2$ . . . $510_n$ respectively corresponding to the memory modules $50_1$ to $50_n$, and the threshold generating circuit 520 may include a plurality of threshold generating logics $520_1$, $520_2$ . . . $520_n$ respectively corresponding to the memory modules $50_1$ to $50_n$.

Each threshold generating logic $520_i$ may set a threshold $RH_{THi}$ of a corresponding memory module $50_i$ among the memory modules $50_1$ to $50_n$ based on information $MI_i$ of the corresponding memory module $50_i$. Here, i is an integer between 1 and n. In some embodiments, the threshold generating logic $520_i$ may set the threshold $RH_{THi}$ by adding an addition value determined based on the information $MI_i$ of the memory module $50_i$ to an initial threshold. The threshold generating logic $520_i$ may provide the threshold $RH_{THi}$ to the corresponding attack defense logic $510_i$ among the attack defense logics $510_1$ to $510_n$. In some embodiments, the information $MI_i$ of the memory module $50_i$ may include at least one of identification information associated with the memory module $50_i$, performance of the memory module $50_i$, and a reliability of the memory module $50_i$. The threshold generating logic $520_i$ may set the threshold $RH_{THi}$ of the memory module $50_i$ to a value obtained by adding the initial threshold to at least one of a basic value determined by the identification information associated with the memory module $50_i$, a performance value determined by the performance of the memory module $50_i$, and a reliability value determined by the reliability of the memory module $50_i$.

The attack defense circuit 510 may receive an address (hereinafter referred to as an "input address") ADDR from a host, and separates the input address input address into a row address (input row address) RA and a memory module address. The attack defense circuit 510 may transfer the input row address RA to the attack defense logic $510_i$ corresponding to the memory module $50_i$ indicated by the memory module address.

The attack defense logic $510_i$ may count the input row address RA, and decide a row address whose count value exceeds the threshold $RH_{THi}$ among row addresses of the memory module $50_i$ as an aggressor row address of the memory module $50_i$. Referring now to FIG. 6, in some embodiments, the attack defense logic $510_i$ may include an address register 511, a counter circuit 512 and a comparator circuit 513. The address register 511 may store a plurality of row addresses. The address register 511 may include a plurality of registers that store a plurality of row addresses, respectively. The address register 511 may store the input row address RA in a corresponding register among the registers.

The counter circuit 512 may store count values of row addresses stored in the address register 511. Each time the input row address RA is stored in the address register 511, the counter circuit 512 may increase a count value of the corresponding row address by a predetermined value (e.g., one). The counter circuit 512 may include a plurality of counters respectively corresponding to the registers, and each of the counters may count a row address stored in a corresponding register among the registers.

In some embodiments, when there is a register in which the input row address RA hits (i.e., a register that stores the same row address as the input row address RA) among the registers of the address register 511, the counter circuit 512 may increase a count value of the counter corresponding to the hit register by the predetermined number (e.g., one). When there is no register in which the input row address RA hits but an empty register exists, the address register 511 may store the input row address RA in the empty register, and the counter circuit 521 may increase a count value of the counter corresponding to the empty register from an initial value (e.g., zero) by the predetermined number. In some embodiments, when there is no register in which the input row address RA hits and there is no empty register, the address register 511 may determine a register to be replaced among the registers according to a predetermined replacement algorithm and store the input row address RA in the register to be replaced, and the counter circuit 512 may increase a count value of the counter corresponding to the register to be replaced by the predetermined value.

The comparator circuit 513 may compare the count value counted by the counter circuit 512 and the threshold $RH_{THi}$ set by the threshold generating circuit 520 of the memory module $50_i$. In some embodiments, each time the input row address RA is received, the comparator circuit 513 may compare the count value increased by the input row address RA with the threshold $RH_{THi}$ of the memory module $50_i$. In some embodiments, when comparing the count value increased by the input row address RA with the threshold $RH_{THi}$, the comparator circuit 513 may compare the count values of the row addresses with the threshold $RH_{THi}$. In some other embodiments, the comparator circuit 513 may compare the count value increased by the input row address with the threshold $RH_{THi}$ without comparing the count values of the row addresses with the threshold $RH_{THi}$.

The comparator circuit 513 may decide a row address whose count value exceeds the threshold $RH_{THi}$ among the row addresses as an aggressor row address. Among the count values of the row addresses, the count value increased by the input row address RA may exceed the threshold $RH_{THi}$. Accordingly, when the count value of the input row address RA exceeds the threshold $RH_{THi}$, the comparator circuit 513 may generate a signal TRR having a predetermined level. The predetermined level may be, for example, a high level as a logic level. Further, when the count value of the input row address RA exceeds the threshold $RH_{THi}$ (i.e., in response to an operation of the comparator circuit 513 outputting the signal TRR having the predetermined level), the address register 511 may decide the row address having the count value exceeding the threshold $RH_{THi}$ (i.e., the input row address RA) among the row addresses as the aggressor row address. In some embodiments, the output signal TRR of the comparator circuit 513 may be used as a target row refresh command. Accordingly, the memory module $50_i$ may perform target row refresh on a victim row determined based on the aggressor row address in response to the output signal TRR of the comparator circuit 513. In some embodiments, the attack defense logic $510_i$ may decide a victim row address VRA based on the aggressor row address and transfer the victim row address VRA to the memory module $50_i$. In some other embodiments, the memory module $50_i$ may decide the victim row address VRA indicating a victim row based on the aggressor row address.

According to the above-described embodiments, the threshold generating circuit 520 may decide the threshold for each memory module $50_i$ based on the information of the corresponding memory module $50_i$, and the attack defense circuit 510 may provide attack defense logic $510_i$ appropriate for each memory module $50_i$ based on the threshold of the corresponding memory module $50_i$. Accordingly, the refresh control circuit 500 may provide the attack defense logic suitable for the memory module $50_i$ connected to the memory controller.

Referring to FIG. 7, in some embodiments, each threshold generating logic $520_i$ may include one or more add circuits 521, 522, and 523. It is assumed in FIG. 7 that the identification information, the performance, and the reliability may be used as the information associated with the memory module $50_i$, and each threshold generating logic $520_i$ includes three add circuits 521, 522, and 523.

The add circuit 521 may output a value obtained by adding an initial threshold $I\_RH_{TH}$ to a value (e.g., a basic value) IN1 determined based on any one piece of information (e.g., identification information) among the information associated with the memory module $50_i$. The add circuit 522 may output a value obtained by adding the output of the add circuit 521 to a value (e.g., a performance value) IN2 determined based another piece of information (e.g., performance) among the information associated with the memory module $50_i$. The add circuit 523 may output a value obtained by adding the output of add circuit 522 to a value (e.g., a reliability value) IN3 determined based on yet another piece of information (e.g., reliability) among the information associated with the memory module $50_i$. Therefore, the output of the add circuit 523 may be used as the threshold $RH_{THi}$.

As such, the threshold generating logic $520_i$ may determine the threshold by adding the initial threshold $I\_RH_{TH}$ to the value(s) determined based on the information associated with the memory module $50_i$ using the add circuits 521, 522, and 523.

Figure 8:
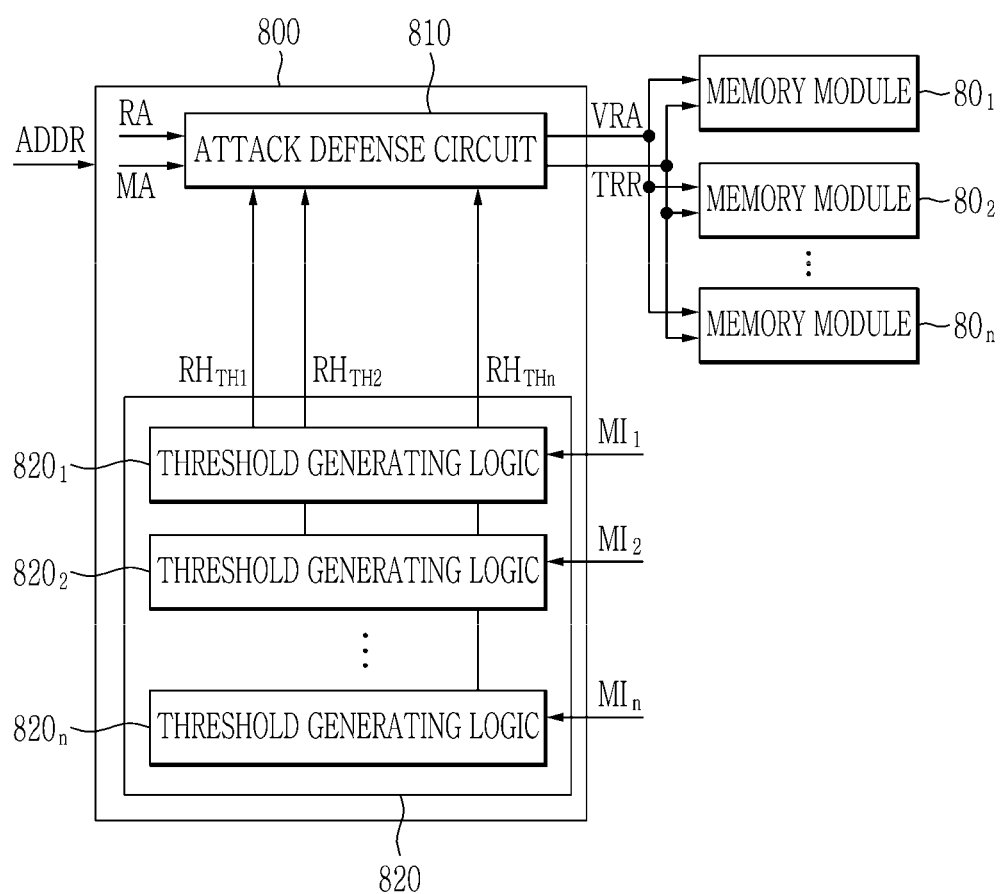
FIG. 8 is a block diagram illustrating a refresh control circuit according to some embodiments.
Figure 9:
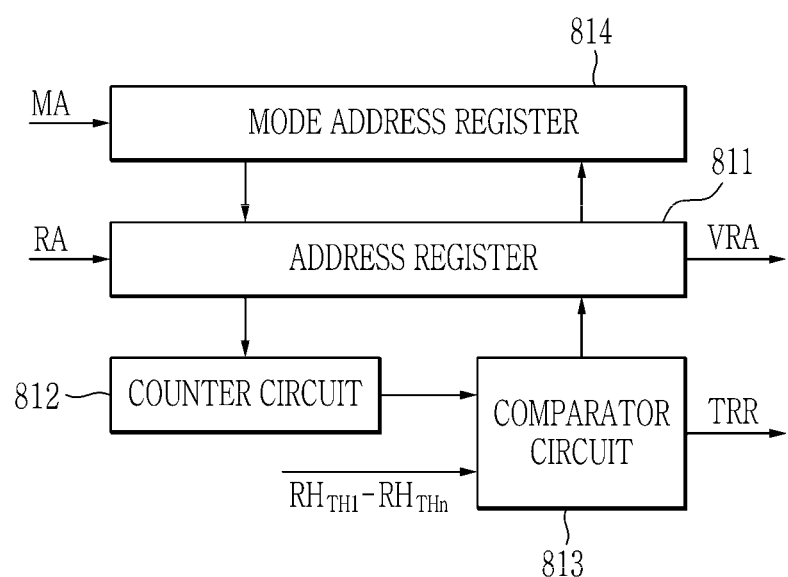
FIG. 9 is a block diagram illustrating an embodiment of the attack defense circuit shown in FIG. 8.

FIG. 8 is a block diagram illustrating an example of a refresh control circuit according to some embodiments, and FIG. 9 is a block diagram illustrating an example of an attack defense circuit shown in FIG. 8. Referring now to FIG. 8, a refresh control circuit 800 may include an attack defense circuit 810 and a threshold generating circuit 820. A memory controller including the refresh control circuit 800 may be connected to a plurality of memory modules $80_1, 80_2 \ldots 80_n$. The attack defense circuit 810 may correspond to the memory modules $80_1$ to $80_n$ in common. The threshold generating circuit 820 may include a plurality of threshold generating logics $820_1, 820_2 \ldots 820_n$ respectively corresponding to the memory modules $80_1$ to $80_n$.

Each threshold generating logic $820_i$ may set a threshold $RH_{THi}$ of a corresponding memory module $80_i$ among the memory modules $80_1$ to $80_n$ based on information $MI_i$ of the corresponding memory module $80_i$, and transfer the threshold $RH_{THi}$ of the memory module $80_i$ to the attack defense circuit 810. Accordingly, the threshold generating logics $820_1$ to $820_n$ may provide the thresholds $RH_{TH1}$ to $RH_{THn}$ respectively corresponding to the memory modules $80_1$ to $80_n$ to the attack defense circuit 810. In some embodiments, the information associated with the memory module $80_i$ may include at least one of identification information associated with the memory module $80_i$, performance of the memory module $80_i$, and a reliability of the memory module $80_i$. The threshold generating logic $820_i$ may set the threshold $RH_{THi}$ of the memory module $80_i$ to a value obtained by adding an initial threshold to at least one of a basic value determined by the identification information associated with the memory module $80_i$, a performance value determined by the performance of the memory module $80_i$, and a reliability value determined by the reliability of the memory module $80_i$.

The attack defense circuit 810 may receive an input address ADDR from a host and separate the input address ADDR into an input row address RA and a memory module address MA. Referring to FIG. 9, in some embodiments, the attack defense circuit 810 may include an address register 811, a counter circuit 812, a comparator circuit 813, and a module address register 814.

The address register 811 may store a plurality of row addresses. The address register 811 may include a plurality of registers that store a plurality of row addresses, respectively. The address register 811 may store an input row address RA in a corresponding register among the registers regardless of a memory module to which the input row address RA belongs. The module address register 814 may store a memory module address MA. That is, each time the input row address RA is received, the module address register 814 may store the memory module address MA of the memory module $80_i$ to which the input row address RA belongs among the memory modules $80_1$ to $80_n$.

The counter circuit 812 may store count values of row addresses stored in the address register 811. Each time the input row address RA is stored in the address register 811, the counter circuit 812 may increase a count value of the corresponding row address by a predetermined value (e.g., increment by one). The counter circuit 812 may include a plurality of counters respectively corresponding to the registers, and each of the counters may count a row address stored in a corresponding register among the registers.

The comparator circuit 813 may compare the count value counted by the counter circuit 812 and the threshold $RH_{THi}$ set by the threshold generating circuit 820 of the memory module $80_i$. In some embodiments, the comparator circuit 813 may select the threshold $RH_{THi}$ of the corresponding memory module $80_i$ from among the thresholds $RH_{TH1}$ to $RH_{THn}$ provided by the threshold generating logics $820_1$ to $820_n$ based on the memory module addresses MA stored in the module address register 814. In some embodiments, each time the input row address RA is received, the comparator circuit 813 may compare the count value of the counter circuit 812 and the threshold $RH_{THi}$ of the corresponding memory module $80_i$.

When the count value of the input row address RA exceeds the threshold $RH_{THi}$, the comparator circuit 813 may output a signal TRR having a predetermined level. Further, when the count value of the input row address RA exceeds the threshold $RH_{THi}$ (i.e., in response to an operation of the comparator circuit 813 outputting the signal TRR having the predetermined level), the address register 811 may decide the row address having the count value exceeding the threshold $RH_{THi}$ (i.e., the input row address RA) among the row addresses as the aggressor row address. In this case, since the count value increased by the input row address RA exceeds the threshold $RH_{THi}$, the memory module address MA stored in the module address register 814 may indicate the memory module $80_i$ to which the aggressor row address belongs. Accordingly, the row address register 811 may transfer a victim row address VRA determined based on the aggressor row address to the memory module $80_i$ indicated by the memory module address MA stored in the module address register 814, and the comparator circuit 813 may transfer the signal TRR having the predetermined level to the memory module $80_i$ indicated by the memory module address MA stored in the module address register 814. According to the above-described embodiments, the attack defense circuit 810 may advantageously reduce the area and/or cost of the refresh control circuit 800 by sharing the attack defense logic among the plurality of memory modules $80_1$ to $80_n$.

Figure 10:
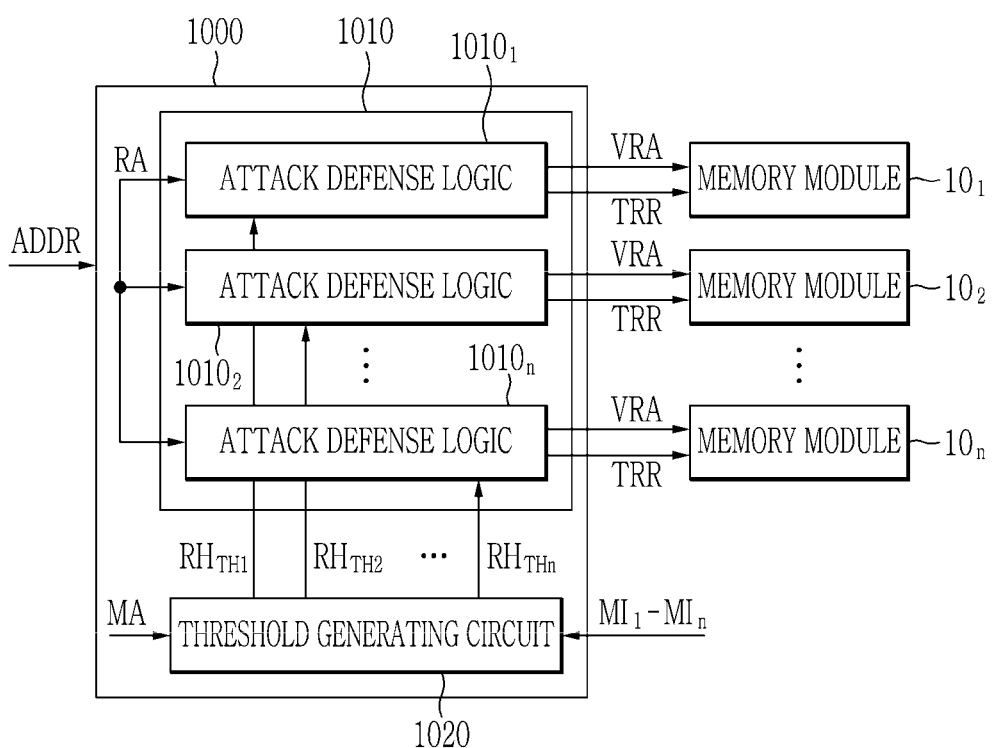
FIG. 10 is a block diagram illustrating a refresh control circuit according to some embodiments.
Figure 11:
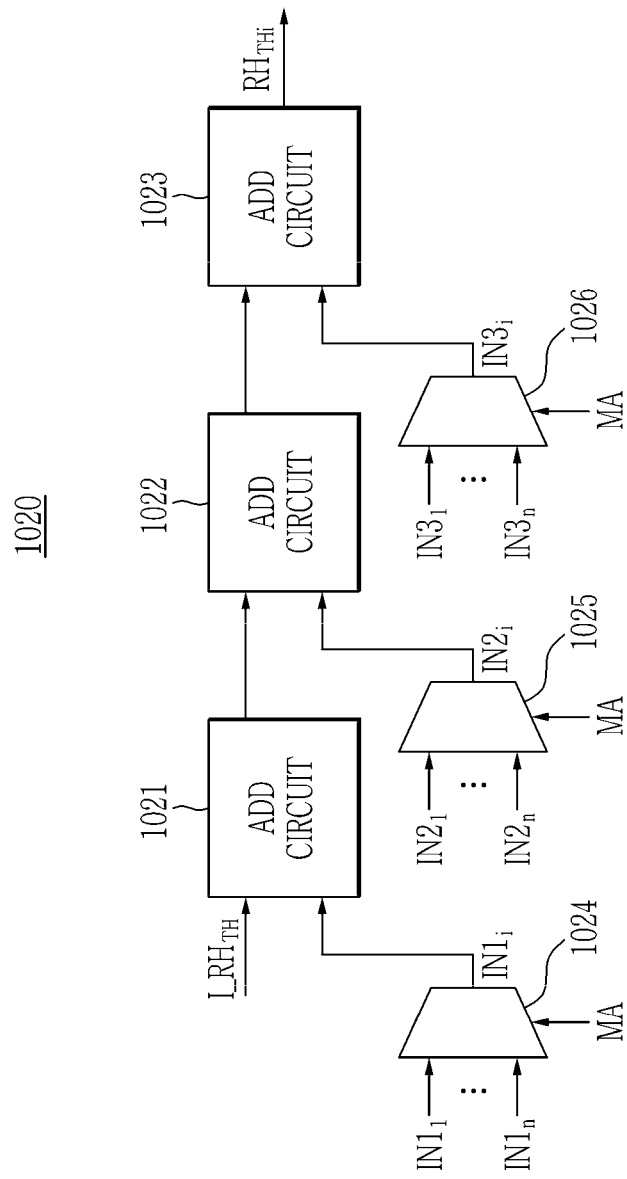
FIG. 11 is a block diagram illustrating an embodiment of the threshold generating circuit shown in FIG. 10.

FIG. 10 is a block diagram illustrating an example of a refresh control circuit according to some embodiments, and FIG. 11 is a block diagram illustrating an example of a threshold generating circuit shown in FIG. 10. Referring now to FIG. 10, a refresh control circuit 1000 may include an attack defense circuit 1010 and a threshold generating circuit 1020. A memory controller including the refresh control circuit 1000 may be connected to a plurality of memory modules $10_1, 10_2 \ldots 10_n$. The attack defense circuit 1010 may include a plurality of attack defense logics $1010_1$, $1010_2 \ldots 1010_n$ respectively corresponding to the memory modules $10_1$ to $10_n$, and the threshold generating circuit 1020 may correspond to the memory modules $10_1$ to $10_n$ in common.

The attack defense circuit 1010 may receive an input address ADDR from a host and separate from the input address ADDR into an input row address RA and a memory module address MA. The attack defense circuit 1010 may transfer the input row address RA to the attack defense logic $1010_i$ corresponding to the memory module $10_i$ indicated by the memory module address MA. Further, the threshold generating circuit 1020 may transfer a threshold $RH_{THi}$ of the memory module $10_i$ indicated by the memory module address MA to a corresponding attack defense logic $1010_i$. Since each attack defense logic $1010_i$ of the attack defense circuit 1010 may operate similarly to the attack defense logic $510_i$ described with reference to FIG. 5 and FIG. 6, their descriptions are omitted.

The threshold generating circuit 1020 may set the threshold $RH_{THi}$ of the memory module $10_i$ indicated by the memory module address MA of the input address based on information associated with the memory module $10_i$, and transfer the threshold $RH_{THi}$ to the attack defense logic $1010_i$ corresponding to the memory module $10_i$. In some embodiments, the information associated with the memory module $10_i$ may include at least one of: (i) identification information associated with the memory module $10_i$, (ii) performance of the memory module $10_i$, and (iii) reliability of the memory module $10_i$. The threshold generating circuit 1020 may set the threshold $RH_{THi}$ of the memory module $50_i$ indicated by the memory module address to a value obtained by adding an initial threshold to at least one of a basic value determined by the identification information associated with the memory module $10_i$, a performance value determined by the performance of the memory module $10_i$, and a reliability value determined by the reliability of the memory module $10_i$. Advantageously, like the attack defense circuit 810 described hereinabove, the threshold generating circuit 1020 may reduce the area and/or cost of the refresh control circuit 1000 by sharing the threshold generating logic among the plurality of memory modules $101$ to $10n$.

Referring to FIG. 11, in some embodiments, the threshold generating circuit 1020 may include a series of one or more "add" circuits 1021, 1022, and 1023, and one or more multiplexing circuits 1024, 1025, and 1026. It is assumed in FIG. 11 that the identification information, the performance, and the reliability are used as the information associated with the memory module $10_i$, and the threshold generating circuit 1020 includes 1021, 1022, and 1023, and three multiplexing circuits 1024, 1025, and 1026.

In response to the memory module address MA, the multiplexing circuit 1024 may output a value (e.g., a basic value) $IN1_i$ determined based on any one piece of information (e.g., identification information) among the information associated with the memory module $10_i$ indicated by the memory module address MA among the memory modules $10_1$ to $10_n$. The add circuit 1021 may output a value obtained by adding an initial threshold $I\_RH_{TH}$ to the value (e.g., the basic value) $IN1_i$ output from the multiplexing circuit 1024. In response to the memory module address MA, the multiplexing circuit 1025 may output a value (e.g., a performance value) $IN2_i$ determined based on another piece of information (e.g., performance) among the information associated with the memory module $10_i$ indicated by the memory module address MA among the memory modules $10_1$ to $10_n$. The next add circuit 1022 may output a value obtained by adding the output of the add circuit 1021 to the value (e.g., the performance value) $IN2_i$ output from the multiplexing circuit 1025. In response to the memory module address MA, the multiplexing circuit 1026 may output a value (e.g., a reliability value) $IN3_i$ determined based on yet another piece of information (e.g., a reliability) among the information associated with the memory module $10_i$ indicated by the memory module address MA among the memory modules $10_1$ to $10_n$. The final add circuit 1023 may output a value obtained by adding the output of the add circuit 1022 to the value (e.g., the reliability value) $IN3_i$ output from the multiplexing circuit 1026. Accordingly, the output of the add circuit 1023 may be used as the threshold $RH_{THi}$ of the memory module $10_i$ indicated by the memory module address MA. As such, the threshold generating circuit 1020 may generate the thresholds $RH_{TH1}$ to $RH_{THn}$ of the memory modules $10_1$ to $10_n$ using the common threshold generating logic.

Figure 12:
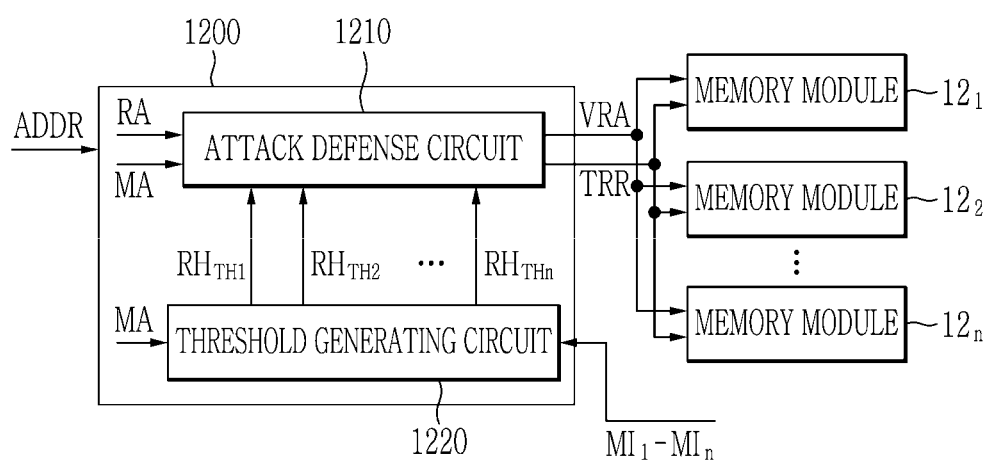
FIG. 12 is a block diagram illustrating a refresh control circuit according to some embodiments.

FIG. 12 is a block diagram illustrating an example of a refresh control circuit according to some embodiments. Referring now to FIG. 12, a refresh control circuit 1200 may include an attack defense circuit 1210 and a threshold generating circuit 1220. A memory controller including the refresh control circuit 1200 may be connected to a plurality of memory modules $12_1$, $12_2$ . . . $12_n$. The attack defense circuit 1210 may correspond to the memory modules $12_1$ to $12_n$ in common, and the threshold generating circuit 1220 may correspond to the memory modules $12_1$ to $12_n$ in common.

The attack defense circuit 1210 may receive an input address ADDR from a host and separate the input address ADDR into an input row address RA and a memory module address MA. The attack defense circuit 1210 may receive a threshold $RH_{THi}$ of the memory module $12_i$ indicated by the memory module address MA from the threshold generating circuit 1220. Since the attack defense circuit 1210 may operate similarly to the attack defense circuit 810 described with reference to FIG. 8 and FIG. 9, its descriptions are omitted.

The threshold generating circuit 1220 may set the threshold $RH_{THi}$ of the memory module $12_i$ indicated by the memory module address MA of the input address ADDR based on information associated with the memory module $12_i$, and transfer the threshold $RH_{THi}$ to the attack defense circuit 1210. Since the threshold generating circuit 1220 may operate similarly to the threshold generating circuit 1020 described with reference to FIG. 10 and FIG. 11, its descriptions are omitted. Thus, because the attack defense circuit 1210 advantageously shares the attack defense logic for the memory modules $12_1$ to $12_n$, and the threshold generating circuit 1220 advantageously shares the threshold generating logic for the memory modules $12_1$ to $12_n$, the area and/or cost of the refresh control circuit 1200 may be reduced.

Figure 13:
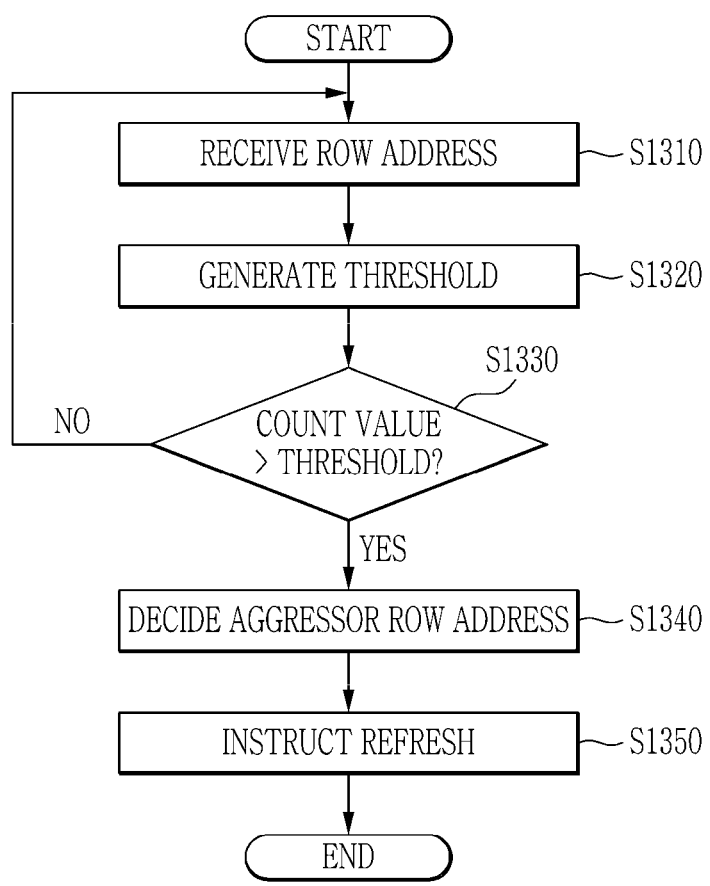
FIG. 13 is a flowchart illustrating a refresh control method of a memory controller according to some embodiments.

FIG. 13 is a flowchart illustrating an example of a refresh control method of a memory controller according to some embodiments. Referring now to FIG. 13, a memory controller may receive an input row address at S1310. The memory controller may set a threshold of a memory module to which the input row address belongs (hereinafter referred to as a "target memory module") among one or more memory modules connected to the memory controller based on information of the target memory module at S1320. The memory controller may compare a count value of the input row address with a threshold of the target memory module at S1330, and decide the input row address as an aggressor row address when the count value of the input row address exceeds the threshold of the target memory module at S1340.

The memory controller may instruct the target memory module to refresh a victim row determined based on the aggressor row address at S1350. In some embodiments, the memory controller may issue a target row refresh command to the target memory module to instruct the refresh of the victim row. In some embodiments, the memory controller may transfer a victim row address indicating the victim row to the target memory module.

Figure 14:
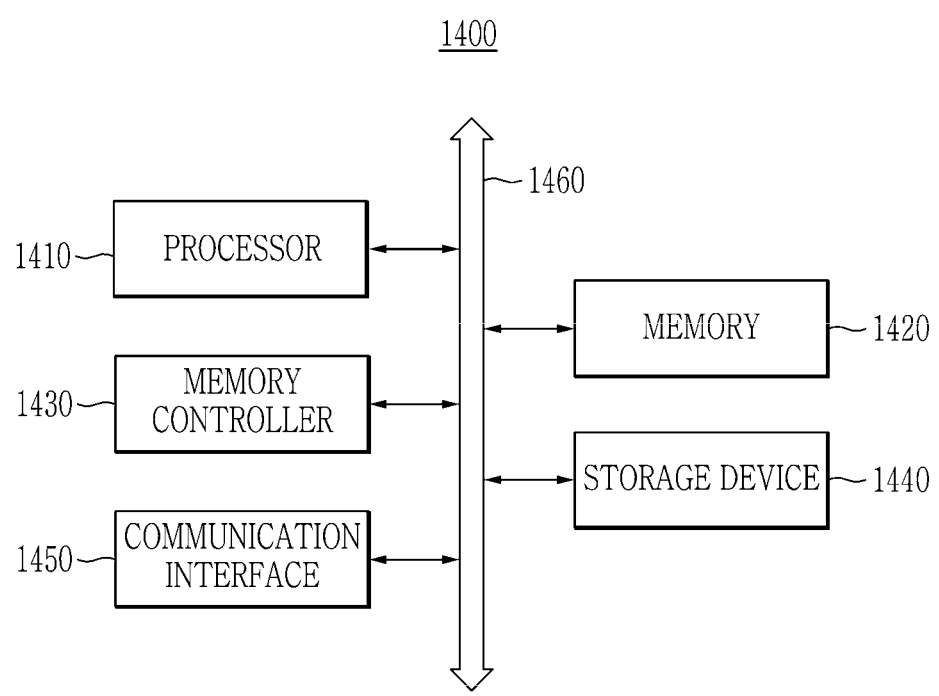
FIG. 14 is a diagram illustrating a computing device according to some embodiments.

FIG. 14 is a diagram illustrating an example of a computing device according to some embodiments. Referring now to FIG. 14, a computing device 1400 may include a processor 1410, a memory 1420, a memory controller 1430, a storage device 1440, a communication interface 1450, and a bus 1460. The computing device 1400 may further include other components. The processor 1410 may control an overall operation of each component of the computing device 1400. The processor 1410 may be implemented with at least one of various processing units such as a central processing unit (CPU), an application processor (AP), and a graphic processing unit (GPU).

The memory 1420 may store various data and instructions. The memory 1420 may be implemented with a memory module described with reference to FIG. 1 to FIG. 13. The memory controller 1430 may control transfers of data or commands to and from the memory 1420. The memory controller 1430 may be implemented with the memory controller described with reference to FIG. 1 to FIG. 13. In some embodiments, the memory controller 1430 may be provided as a separate chip from the processor 1410. In some embodiments, the memory controller 1430 may be provided as an internal component of processor 1410.

The storage device 1440 may non-temporarily store programs and data. In some embodiments, the storage device 1440 may be implemented with a non-volatile memory. The communication interface 1450 may support wired or wireless Internet communication of the computing device 1400. In addition, the communication interface 1450 may support various communication methods other than Internet communication. The bus 1460 may provide a communication function between the components of the computing device 1400. The bus 1460 may include at least one type of bus according to a communication protocol between the components.

In some embodiments, each of the components, elements, modules, or units represented by a block as illustrated in FIG. 1 to FIG. 13 may be implemented as various numbers of hardware, software, and/or firmware structures that execute respective functions described above, according to embodiments. For example, at least one of these components, elements, modules, or units may include various hardware components including a digital circuit, a programmable or non-programmable logic device or array, an application specific integrated circuit (ASIC), or other circuitry using a digital circuit structure, such as a memory, a processor, a logic circuit, a look-up table, etc., that may execute the respective functions through controls of one or more microprocessors or other control apparatuses. Further, at least one of these components, elements, modules, or units may include a module, a program, or a part of code, which contains one or more executable instructions for performing specified logic functions, and executed by one or more microprocessors or other control apparatuses. Functional aspects of embodiments may be implemented in algorithms that execute on one or more processors.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

What is claimed is:

1. A memory device, comprising:
    a plurality of memory modules; and
    a memory controller electrically coupled to the plurality of memory modules and having refresh control circuit therein, which includes:

a threshold generating circuit configured to determine a respective row hammer threshold ($RH_{TH}$) for each of the plurality of memory modules by adjusting an initial row hammer threshold ($I\_RH_{TH}$) to account for at least one of an identification of a respective memory module of the plurality of memory modules, a performance of the respective memory module, and a reliability of the respective memory module; and an attack defense circuit configured to compare a respective row access count associated with each of a plurality of potential row hammer aggressor rows within the plurality of memory modules against the $RH_{TH}$ associated with the respective memory module to identify the presence of a victim row therein to be subject to a row refresh command for a corresponding victim row address (VRA) of the victim row, wherein the threshold generating circuit is configured to determine the $RH_{TH}$ for each of the plurality of memory modules by increasing the $I\_RH_{TH}$ for at least some of the plurality of memory modules.

2. The device of claim 1, wherein the identification of the respective memory module is selected from a group comprising a manufacturer of the respective memory module and a serial number of the respective memory module; wherein the performance of the respective memory module is associated with its read and/or write speed; and wherein the reliability of the respective memory module is associated with its usage period.

3. The device of claim 2, wherein the $RH_{TH}$ determined for a first one of the plurality of memory modules is greater than the $RH_{TH}$ determined for a second one of the plurality of memory modules when the first one of the plurality of memory modules has a shorter usage period than the second one of the plurality of memory modules.

4. The device of claim 2, wherein the plurality of memory modules include a first dual in-line memory module (DIMM) and a second DIMM having the same manufacturer and equivalent performance characteristics; and wherein the refresh control circuit is configured to use a lower $RH_{TH}$ for the first DIMM and a higher $RH_{TH}$ for the second DIMM when the usage period of the first DIMM is longer than the usage period of the second DIMM.

5. The device of claim 1, wherein the threshold generating circuit is configured to determine the respective row hammer threshold ($RH_{TH}$) for each of the plurality of memory modules by adjusting the initial row hammer threshold ($I\_RH_{TH}$) to account for the identification of the respective memory module, the performance of the respective memory module, and the reliability of the respective memory module.

6. The device of claim 5, wherein the threshold generating circuit comprises a plurality of adder circuits electrically coupled in series; wherein a first of the plurality of adder circuits in the series is configured to receive $I\_RH_{TH}$; and wherein a last of the plurality of adder circuits in the series is configured to generate $RH_{TH}$.

7. The device of claim 1, wherein the threshold generating circuit comprises a plurality of threshold generating logic circuits; and wherein each of the plurality of threshold generating logic circuits is associated with a corresponding one of the plurality of memory modules.

8. The device of claim 7, wherein the attack defense circuit comprises a plurality of attack defense logic circuits;

and wherein each of the plurality of attack defense logic circuits is associated with a corresponding one of the plurality of memory modules.

9. The device of claim 1, wherein the attack defense circuit comprises a plurality of attack defense logic circuits; and wherein each of the plurality of attack defense logic circuits is associated with a corresponding one of the plurality of memory modules.

10. The device of claim 1, wherein the attack defense circuit is configured to identify the presence of a first victim row within a first one of the plurality of memory modules when the row access count associated with a potential aggressor row extending immediately adjacent the first victim row exceeds the $RH_{TH}$ associated with the first one of the plurality of memory modules.

11. The device of claim 10, wherein the memory device is configured to refresh the first victim row upon its identification by the attack defense circuit.

12. A refresh control method of a memory controller to which a plurality of memory modules are connected, comprising:

determining a respective row hammer threshold ($RH_{TH}$) for each of the plurality of memory modules by adjusting an initial row hammer threshold ($I\_RH_{TH}$) to account for at least one of an identification of a respective memory module of the plurality of memory modules, a performance of the respective memory module, and a reliability of the respective memory module; and comparing a respective row access count associated with each of a plurality of potential row hammer aggressor rows within the plurality of memory modules against the $RH_{TH}$ associated with the respective memory module to identify the presence of a victim row therein to be refreshed, wherein the $RH_{TH}$ for each of the plurality of memory modules is determined by increasing the $I\_RH_{TH}$ for at least some of the plurality of memory modules.

13. The method of claim 12, wherein said determining comprises determining the respective row hammer threshold ($RH_{TH}$) for each of the plurality of memory modules by adjusting the initial row hammer threshold ($I\_RH_{TH}$) to account for the identification of the respective memory module, the performance of the respective memory module, and the reliability of the respective memory module.

14. The method of claim 12, further comprising identifying the presence of a first victim row within a first one of the plurality of memory modules when the row access count associated with a potential aggressor row extending immediately adjacent the first victim row exceeds the $RH_{TH}$ associated with the first one of the plurality of memory modules.

15. The method of claim 14, further comprising refreshing the first victim row upon its identification.

16. A memory control device configured to be electrically coupled to a plurality of memory modules, comprising:

a threshold generating circuit configured to determine a respective row hammer threshold ($RH_{TH}$) for each of the plurality of memory modules by adjusting an initial row hammer threshold ($I\_RH_{TH}$) to account for at least one of an identification of a respective memory module of the plurality of memory modules, a performance of the respective memory module, and a reliability of the respective memory module; and an attack defense circuit configured to compare a respective row access count associated with each of a plurality of potential row hammer aggressor rows within the plurality of memory modules against the $RH_{TH}$ associated with the respective memory module to identify the presence of a victim row therein to be refreshed,
wherein the identification of the respective memory module is selected from a group comprising a manufacturer of the respective memory module and a serial number of the respective memory module,
wherein the performance of the respective memory module is associated with its read and/or write speed, and
wherein the reliability of the respective memory module is associated with its usage period.

* * * * *